Patented Nov. 29, 1938

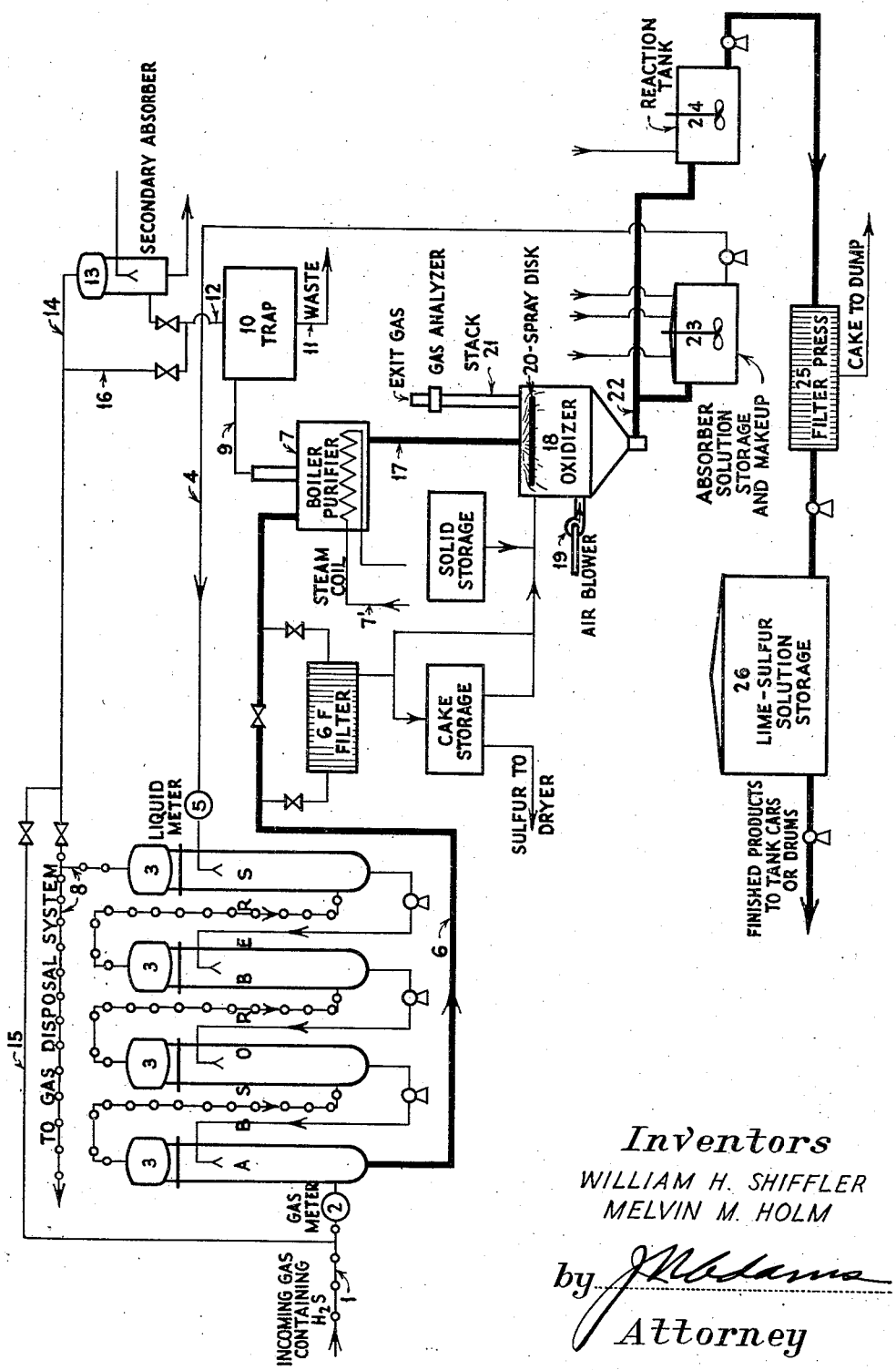

2,138,215

UNITED STATES PATENT OFFICE 2,138,215

PROCESS FOR PRODUCING SULPHUR COMPOUNDS

William H. Shiffler and Melvin M. Holm, Berkeley, Calif., assignors to Standard Oil Company of California, San Francisco, Calif., a corporation of Delaware Application July 8, 1935, Serial No. 30,355

9 Claims. (Cl. 23—138)

This invention relates to a new and useful process for the conversion of by-product hydrogen sulphide into useful sulphur compounds and more particularly into such compounds as calcium pentasulphide and precipitated or flotation sulphur.

The use of a solution, commonly known as "lime-sulphur" solution, containing calcium pentasulphide ($CaS_5$) as the major active ingredient is well known in agricultural and horticultural pest control work.

Such solutions were until recently prepared by boiling an aqueous suspension of lime with elementary sulphur. Due to the nature of the reaction involved, this method was wasteful of materials, as much as thirty percent of the lime and ten percent of the sulphur being consumed in the formation of substantially valueless products. Volck in U. S. Patent #1,517,522 issued December 2, 1924, showed that in a reaction in which a part of the sulphur is supplied by hydrogen sulphide, the undesired side products can be eliminated and a substantial saving in materials can be effected. In an application, Serial Number 30,353, copending herewith, we have shown how the hydrogen sulphide required in the foregoing Volck process may be derived from dilute and impure gases, and in particular the by-product gases resulting from the industrial cracking of sulphur bearing petroleum oils, with the production of a satisfactory product for parasiticidal use.

We have now discovered a series of reactions whereby it is possible to derive the total sulphur required in the production of calcium pentasulphide directly from hydrogen sulphide, and of still greater economic importance, from the hydrogen sulphide contained at considerable dilution in certain of the by-product gases of the petroleum industry.

It is the broad object of this invention to provide a process wherein a series of reactions is brought about in such cyclic sequence as to result in the highly efficient production of calcium pentasulphide and related compounds in a state of purity sufficient for industrial and particularly for horticultural use.

It is a further object of our invention to provide a process employing a fundamental cycle of reactions which is so flexible as to permit the production of any one of several important sulphur containing materials from the impure hydrogen sulphide of petroleum gases entirely at the will of the operator.

Lime or calcium hydroxide suspended in water will absorb hydrogen sulphide substantially quantitatively according to the following equation:

I.   $Ca(OH)_2 + 2H_2S = Ca(HS)_2 + 2H_2O$

When a calcium hydrosulphide solution is contacted with oxygen or air in the presence of suitable catalysts, a part of the hydrosulphide sulphur is oxidized and pentasulphide is produced as indicated in the following equation:

II.   $5Ca(HS)_2 + 4O_2 = 2CaS_5 + 3Ca(OH)_2 + 2H_2O$

In order for this reaction to find utility in the commercial production of calcium pentasulphide or lime-sulphur solution it is obviously necessary that substantially all of the hydrosulphide sulphur oxidized shall go to pentasulphide and not to some other of the possible oxidation products. In an application, Serial No. 30,354, copending herewith we have disclosed a process wherein the foregoing reaction is modified and controlled to give such a result in a highly desirable manner. The reaction of this new process is expressed by the following equation:

III.   $2Ca(HS)_2 + 4O_2 + 6H_2S = 2CaS_5 + 8H_2O$

A number of metal sulphides have been found to catalyze this reaction; nickel, iron, cobalt and copper being useful with nickel apparently the most efficient.

With a source of pure hydrogen sulphide or with a gas containing hydrogen sulphide with no interfering substance present the reaction of Equation III has been shown to be well suited to the production of a desirable grade of lime-sulphur solution. Unfortunately, however, a large part of the by-product hydrogen sulphide now available in the petroleum industry is associated with other compounds, probably volatile sulphur bodies such as mercaptans and the like, which contribute an odor to lime-sulphur solutions produced therefrom which is so offensive and so suggestive of an inferior product as to render them substantially unmarketable.

While by the process of our former invention (application Serial No. 30,353) it is possible to produce pure hydrogen sulphide from such gases it may, for various reasons, sometimes be undesirable to utilize such a process under prevailing conditions and hence still another method of arriving at the same end may be preferable.

We have now discovered an indirect method whereby the hydrogen sulphide for this reaction may be derived from the same impure gases in a highly satisfactory manner. We have found that the following reaction:

IV.   $CaS_5 + H_2S = Ca(HS)_2 + 4S$ may be made to proceed in either direction by appropriate changes in concentrations and in temperature. In other words it is a typical equilibrium reaction. We have determined the equilibrium constant:

$$K = \frac{(SH^-)^2}{(S_5^=)(H_2S)}$$

for the reaction as written to be about 10.2 at 70° F., 4.0 at 100° F. and 0.78 at 161° F.

In view of our previous discovery that calcium hydrosulphide solutions prepared from the impure hydrogen sulphide of petroleum gases may be freed from objectionable impurities by boiling, the significance of the reversibility of reaction IV becomes at once apparent. By causing reaction IV to proceed from left to right as written, in one step of a process impure hydrogen sulfide can be used to build up a calcium hydrosulphide solution carrying free sulphur in suspension. This solution can next be freed from impurities by boiling and the reaction can then be caused to proceed from right to left in another step to supply the pure hydrogen sulphide required in the oxidation reaction of Equation III. Due, however, to the ease of reversibility of reaction IV this purification step is found to be attended with certain minor difficulties not encountered when hydrosulphide solutions containing no free sulphur are subjected to the same treatment. While in many cases adequate purification can be effected in spite of such difficulties it may in other instances prove desirable to remove the sulphur from the solution prior to boiling and then to return it to the subsequently cooled solution as more fully hereinafter described.

It thus becomes apparent from an addition of Equations I, III and reversible IV as follows:

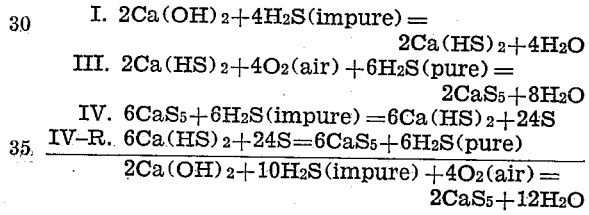

that calcium pentasulphide may be produced from lime, impure hydrogen sulphide and the oxygen of air by a relatively simple cycle of operations. In actual practice the reactions of Equations I and IV would be brought about simultaneously in a hydrogen sulphide absorption step as follows:

V. $2Ca(OH)_2 + 6CaS_5 + 10H_2S =$
$$8Ca(HS)_2 + 24S + 4H_2O$$

The product from this step after purification enters the oxidation stage where a reaction corresponding to the sum of Equations III and IV-R is effected:

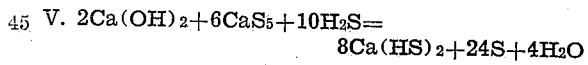

One-fourth of the calcium pentasulphide produced in this reaction is removed from the system and the remaining three fourths is admixed with the appropriate amount of lime and returned to the absorption stage thus completing the cycle.

Obviously, in order to initiate such a cycle either calcium pentasulphide or sulphur must be provided from an external source, sulphur being the logical choice because of cost. Once initiated the operation is extremely simple though possessed of a high degree of flexibility.

The flexibility of the fundamental cycle of reactions just outlined makes possible the production of pentasulphide, of free sulphur, of pure hydrogen sulphide and of substantially pure thiosulphate as may be required, all from the impure hydrogen sulphide of by-product petroleum gases. For instance merely by recycling all of the calcium pentasulphide produced in reaction VI without the addition of lime, precipitated or "flotation" sulphur may be made the product of the system instead of lime-sulphur solution. Such a cycle is clearly indicated and its relation to reaction VI and to the fundamental cycle is apparent from the following equations:

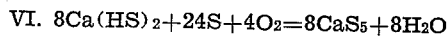

which show that one fourth of the sulphur produced in the absorption stage is withdrawable from the cycle as product.

Certain adaptations of this latter cycle are more fully disclosed and claimed in another application (Serial No. 30,352) copending herewith.

While operation of the process for the production of sulphur requires the removal of only one fourth of the sulphur product per cycle, filtering equipment adequate to handle the total amount so produced will usually increase the overall cost of a plant but slightly and will at the same time make possible an entirely satisfactory purification of the hydrosulphide for the production of lime-sulphur solutions, as hereinbefore suggested, when the cycle is being operated for that purpose.

In order that the actual operation of the basic cycle of reactions and of the various modifications thereof which have been discussed may be better understood reference will be had to the accompanying flow diagram.

In starting the cycle a lime suspension is charged from storage tank 23 through line 4 and meter 5 to an appropriate absorption system 3—3'—3''—3''' wherein it is contacted countercurrent with hydrogen sulphide bearing gas as for instance the gas from a petroleum cracking process or a West Texas natural gas. The calcium hydrosulphide solution thus produced is run through line 6 to an appropriate boiler 7 where it may be boiled free of mercaptans and other objectionable volatile compounds before passing on through line 17 to the oxidizer 18. In the oxidizer nickel chloride is added to the solution in amount to give 0.02 to 0.10% of nickel sulphide after which intimate contact is made between the solution and air while elementary sulphur is added at such rate that a slight partial pressure of hydrogen sulphide, for example, 0.001 to 0.005 atmosphere, is continually maintained in the exit gas. The temperature may be atmospheric or moderately above. It will usually be convenient to equip the oxidizer 18 with an appropriate internal filter to prevent the nickel sulphide catalyst from passing out with the exit liquid. Provision for recycling the solution through 18 to obtain more complete oxidation than possible in a single pass may also be desirable, though no such provision has been shown in the drawing. Inclusion of some form of cooler in this return line may also be advantageous in order to appropriately utilize or dissipate the rather considerable amount of heat liberated in the oxidation reaction.

When, as will usually be the case, continuous operation of the cycle is contemplated and a sufficient reserve of this oxidized solution, which is to become the absorbing solution, is collected in storage tank 23, to provide for normal fluctuations in plant capacity, the operating cycle may be started. When lime-sulphur solution is the desired product, lime is added to the solution in tank 23 or on its return to the absorption step, in one of the towers (3—3''') so as to maintain a molecular ratio of lime to pentasulphide in the system as a whole of approximately 1:3.

While by no means necessary, it is obviously desirable whenever convenient, to maintain the H₂S absorption step under superatmospheric pressure. The gas rate through the absorbers will usually be controlled by the extent to which it is necessary or desirable to remove hydrogen sulphide from the gas though too high rates may be undesirable due to a tendency to carry away the very finely divided sulphur which is being precipitated. This tendency is of sufficient moment that it may in many cases be desirable to provide the gas escape line 8, with a settling chamber or a filtering device. The rate of passage of solution is of course regulated so that a high conversion of lime and pentasulphide to hydrosulphide and sulphur is effected. Under some conditions it may be more desirable to maintain a higher rate of liquid passage through the absorbers than will permit of complete reaction and to provide recirculation of the solution in order to provide the desired contact. The temperature is maintained as low as convenient without special means for cooling.

In addition to precautions against blow-by of sulphur one further feature to be considered in the design of absorption apparatus for use in our process is the elimination of dead spaces and sidepockets in which sulphur can lodge and build up.

On leaving the last absorber the sulphur bearing hydrosulphide solution passes through line 6 to purifier 7 with or without at the same time passing through filter 6F which may be any convenient form of continuous filter. In case extreme freedom from odor is unnecessary in the product this filter may be bypassed and sufficient removal of odor producing bodies effected by mild warming and blowing with inert gas in the boiler-purifier 7. It will in general, however, be found desirable to remove the suspended sulphur from the hydrosulphide solution in order that a thorough purification may be effected.

As hereinbefore indicated, objectionable bodies are readily eliminated by boiling off an appreciable fraction of the solution, usually 5–10%. The distillate from this step passes out through line 9 to a condenser trap 10 where the water is separated and the sulphur containing gases and vapors may be conducted to an auxiliary absorber 13 for further utilization or they may be led directly to the gas disposal system.

The purified solution is passed to the oxidizer 18 where sulphur previously removed is returned and nickel salt is added to maintain the nickel sulphide catalyst at about 0.06% by weight of the solution. Oxidation by means of air supplied by blower 19 at atmospheric or higher temperature and pressure is then effected. The sulphur, as required by Equation VI, is preferably introduced continuously at such rate that a small concentration of hydrogen sulphide is always maintained in the gas escaping through stack 21. This feature is so essential to the satisfactory and economical operation of our process that we prefer usually to equip this vent with a continuous and automatic analyzer which may even be made to automatically control the rate of sulphur addition.

When calcium hydrosulphide has been largely oxidized to pentasulphide the solution is drawn off through line 22, three fourths being led to storage tank 23 for recirculation while the remainder passes from the cycle to tank 24 where residual traces of hydrosulphide may be reacted with additional lime and sulphur and the solution thus made ready for final clarification either by settling and decantation or by filtration prior to distribution.

The concentration of this final product may, as previously suggested, be controlled by the quantity of make-up water which is added to the absorbing solution in tank 23 or it may be adjusted during the final neutralization step in 24.

When the cycle is being operated for the production of sulphur rather than lime-sulphur solution, no lime is added to the absorbing solution and the catalyst must be confined to the oxidation apparatus 18. The sulphur collected on filter 6F will then be substantially pure and the previously indicated one quarter may be segregated directly as finished product.

While various specific steps have been suggested and others have been implied and a general scheme of apparatus has been indicated for the application of the particular set of fundamental reactions which we have disclosed, it will be perfectly obvious to one skilled in the art that many other specific combinations of steps and/or conditions may be devised to take advantage of special circumstances in the application of these same fundamental reactions without departing from the spirit of our invention.

For instance, arsenic or manganous sulphide may be substituted for the nickel sulphide catalyst in the oxidation stage whereupon operation as described for starting the lime-sulphur cycle will result in the production of thiosulphate solution directly. Such operation obviously requires no recycling and hence the oxidized solution would be discharged completely to tank 24 and fresh lime suspension would be charged continuously to tank 23.

Still another modification of the cycle might prove highly desirable in localities where cheap natural sulphur is available. By adding such sulphur to the oxidizer in what we have hitherto called the lime-sulphur cycle instead of returning sulphur from filter 6F, the system could be made to produce lime-sulphur and "flotation" sulphur simultaneously. Quite obviously a similar procedure might be adopted to any extent necessary or desirable to smooth out fluctuations in the supply of hydrogen sulphide or to augment the supply in case it should not prove adequate for requirements of both lime-sulphur solution and precipitated or refined sulphur.

Having disclosed a novel set of chemical reactions and having taught their application to the production of commercially desirable sulphur containing products in a practical and economic manner from dilute and impure hydrogen sulphide containing gases, what we claim is:

1. The method of oxidizing hydrosulphide solutions by means of an oxygen containing gas, in the presence of an insoluble metal sulphide catalyst and while hydrogen sulphide is maintained at a partial pressure greater than its equilibrium pressure at the reaction temperature over the hydrosulphide solution alone by reacting elementary sulphur with said hydrosulphide solution.

2. The method of oxidizing hydrosulphide solutions as in claim 1 wherein the metal sulphide catalyst is selected from the class consisting of: nickel sulphide, ferrous sulphide, cobalt sulphide and cuprous sulphide.

3. The method of oxidizing hydrosulphide solutions as in claim 1 wherein the hydrosulphide is calcium hydrosulphide.

4. The method of oxidizing hydrosulphide solutions as in claim 1 wherein the partial pressure of hydrogen sulphide in the reaction zone is maintained above about 0.001 of an atmosphere.

5. The method of oxidizing calcium hydrosulphide solution by means of air in the presence of nickel sulphide as the oxidation catalyst and in the presence of hydrogen sulphide maintained at a partial pressure greater than its equilibrium pressure at the reaction temperature over the hydrosulphide solution alone by means of the reaction between elementary sulphur and the hydrosulphide solution being oxidized.

6. The method of oxidizing calcium hydrosulphide solution as in claim 5 wherein oxidation is arrested at the point where the major product of the reaction is calcium pentasulphide.

7. In a process for the production of elementary sulphur and/or lime sulphur solution, the steps of absorbing hydrogen sulphide in a solution which contains calcium pentasulphide with or without additional lime, of separating sulphur precipitated thereby and of subsequently oxidizing the resultant hydrosulphide solution with air while adding elementary sulphur thereto.

8. The method of oxidizing a calcium hydrosulphide solution with air while adding elementary sulphur as in claim 7, wherein the sulphur is added continuously and at such rate as to maintain a partial pressure of at least 0.001 atmosphere of hydrogen sulphide over the solution.

9. A continuous cyclic process for simultaneously producing lime-sulphur solution and elementary sulphur comprising the steps of absorbing hydrogen sulphide in a solution containing calcium pentasulphide, of separating the sulphur produced thereby, of purifying the sulphur-free solution by boiling until acid reacting organic sulphur bodies are eliminated, of oxidizing the purified hydrosulphide solution to pentasulphide by means of air in the presence of elementary sulphur and a metal sulphide catalyst, of separating a portion of the calcium pentasulphide so produced and of recycling the remainder for the further absorption of hydrogen sulphide.

WILLIAM H. SHIFFLER.
MELVIN M. HOLM.